Figure 1:
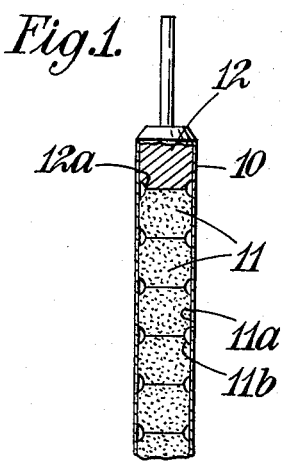

United States Patent Office 3,192,621
Patented July 6, 1965

3,192,621
FUEL ELEMENTS FOR NUCLEAR REACTORS
Stefan George Bauer, Hilton, and Norman Battle, Derby, England, assignors to Rolls-Royce Limited, Derby, England, a British company
Filed July 5, 1960, Ser. No. 40,759
Claims priority, application Great Britain, July 10, 1959, 23,864/59
8 Claims. (Cl. 29—510)

This invention comprises improvements in or relating to fuel elements for nuclear reactors and more particularly is concerned with fuel elements of the class comprising a thin tubular casing containing pellets of fissile material. Such a fuel element will be referred to as a fuel element of the class specified.

The material of the casing usually has a substantially greater coefficient of thermal expansion than the material of the pellets and differential expansion between the casing and the pellets may result in displacement of the pellets, even though they are originally a tight fit in the casing, and may also result in damage to the casing.

According to the invention therefore the pellets for a fuel element of the class specified have portions of those surfaces which are to contact the casing made of reduced dimensions as compared with the remainder of these surfaces so as to be out of contact with the casing on insertion into the casing, and, after insertion of the pellets, the casing is deformed into contact with the reduced dimension surface portions so as to retain the pellets axially in position.

The pellets may be formed so that they are a push fit in the casing in which case the deformation of the casing serves to ensure axial location of the pellets and good heat transfer contact between the reduced dimension surface portions and the casing, but the pellets are preferably of such dimensions as to be a slack fit in the casing so as to facilitate insertion of the pellets in which case the deformation operation is effected so as not only to cause the casing to make good heat transfer contact with the reduced dimension portions but also with the remainder of the contacting surfaces.

If, as is usual, the pellets are basically of cylindrical form, they may have reduced diameter portions at each end and preferably afforded by curved-section rebates such that when two pellets abut end to end they form a semi-circular section annular channel into which the casing is deformed.

In one particular method of manufacture of fuel elements, the pellets having reduced dimension surface portions are inserted in the tubular metal casing in end to end abutment, the pellets being a slack fit diametrically in the casing, such that close tolerances are not required in their manufacture, the ends of the casing are plugged, for example by stainless steel plugs, and then the casing is subjected externally to fluid pressure to deform the casing into close contact with both the main and the reduced dimension surface portions so locating the pellets axially in the casing, and providing for good heat transfer between the pellets and the casing even though the diameters of adjacent pellets differ by as much as say .005".

This method is particularly useful in the manufacture of fuel elements which, as described in the specification of United States patent application No. 857,836 filed December 7, 1959 (S. G. Bauer) which matured into Patent No. 3,096,264, are provided externally with radially projecting ribs for maintaining a desired spacing of adjacent fuel elements, since good contact is obtained between the casing and the reduced portions of the pellets adjacent the rib which would be difficult to obtain by a mechanical swaging operation, and since the wrapping action occurring in producing good contact of the casing with the main portions of the initially slack fitting pellets is accommodated at the root of the rib.

The invention also includes fuel elements having pellets located axially in a tubular casing as above set forth.

Figure 2:
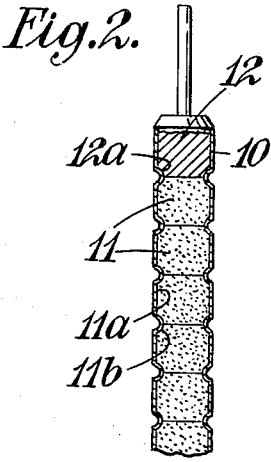
Figure 3:
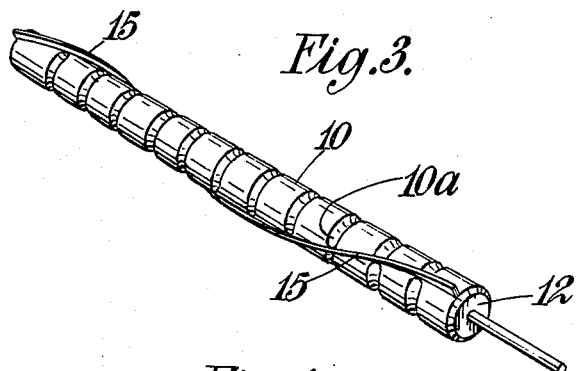
Figure 4:
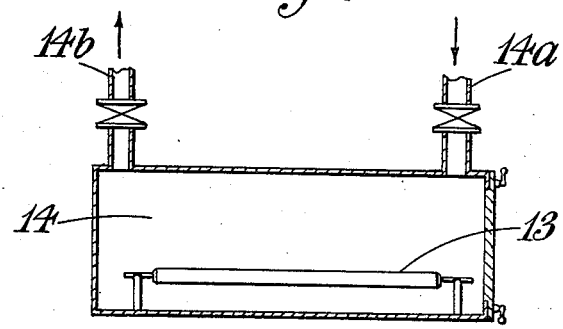

The accompanying drawings illustrate the invention by way of example. In the drawings:

FIGURES 1 and 2 are axial sections through a fuel element before and after deformation of the casing, FIGURE 3 is a perspective view of one end of a finished fuel element, and FIGURE 4 illustrates a manufacturing step.

Referring to FIGURES 1 to 3, the fuel element is of the class specified and comprises a tubular metal casing 10, which is initially cylindrical, a large number of pellets 11 of fissile material disposed in end to end abutment in the casing 10, and closure plugs 12 of stainless steel which are brazed or welded in position.

The pellets 11 are basically of cylindrical form and have each a main cylindrical surface portion 11a of such diameter that the pellet is a slack fit in the casing, and reduced dimension end surface portions 11b formed by arcuate-section annular rebates. The rebates at the abutting ends of each pair of pellets, and also the rebate at the end of the upper pellet 11 and the corresponding rebate 12a in the plug 12, form annular channels of substantially semi-circular cross-section.

After the pellets 11 and plugs 12 have been inserted into the tubular casing 10 (FIGURE 1), the casing is deformed so as to enter the annular channels (FIGURES 2 and 3) to form axial abutments 10a for locating the pellets individually axially of the casing even when the fuel element acquires a temperature such that, due to differential expansion of the casing and pellets, the pellets become loose in the casing. Preferably, the deformation is effected by placing the fuel element 13 in a chamber 14 (FIGURE 4) having valve-controlled inlet and outlet connections 14a, 14b, and by feeding pressure fluid into the chamber at such pressure, say 6000 p.s.i., as to deform the casing. This method of deformation is especially suitable when, as shown in FIGURE 3, the casing 10 has an external spacer rib 15 formed by the method proposed in United States application No. 857,836.

Whilst the rebates need not be curved as shown, for example they may be of taper section, it is preferred to use such a form of rebate so as to permit the casing to be deformed into full contact with the reduced dimension portions 11b.

In one example, the casing is formed from stainless steel .010" thick and the pellets are of uranium oxide and have a length of .750", a main diameter of .500" and a diameter at their ends of .490". The pellets are a slack fit in the casing and the deformation operation is carried out by subjecting the casing externally to a fluid pressure of 6000 p.s.i. Good heat transfer contact is obtained between the casing and the pellets over their main and reduced dimension portions. Also the pellets are located axially in such a way as to prevent their displacement even when the fuel element becomes hot in operation.

We claim:

1. In the manufacture of a fuel element for a nuclear reactor, the steps of producing a thin walled tubular casing of uniform internal diameter, producing a plurality of substantially cylindrical pellets of fissile material, each said pellet having an external diameter less than that of the casing so as to be a slack fit in the casing and having at least one rebate in the length thereof, inserting the pellets in end to end relation in the casing, and deforming the casing into contact with the pellets and into said rebates thereby to locate the pellets against displacement lengthwise of the tubular casing.

2. In the manufacture of a fuel element for a nuclear reactor, the steps of producing a thin walled tubular casing of uniform internal diameter, producing a plurality of substantially cylindrical pellets of fissile materials, each said pellet having an external diameter less than that of the casing so as to be a slack fit in the casing and having a rebate at each end thereof, inserting the pellets in end to end abutment in the casing, said rebates at the abutting ends of the pellets together defining annular channels, and deforming the casing into contact with the pellets and into said annular channels thereby to locate the pellets against displacement lengthwise of the tubular casing.

3. The manufacture according to claim 2, wherein said rebates have a curved section.

4. The manufacture according to claim 2, wherein the rebates have a taper section.

5. In the manufacture of a fuel element for a nuclear reactor, the steps of producing a thin walled tubular casing of uniform internal diameter, producing a plurality of substantially cylindrical pellets of fissile material, each said pellet having an external diameter less than that of the casing so as to be a slack fit in the casing and having a rebate at each end thereof, inserting the pellets in end to end abutment in the casing, said rebates at the abutting ends of the pellets together defining annular channels, securing closure plugs in the ends of the casing, and subjecting the casing externally to fluid pressure to deform the casing into close contact with the external surface of the pellets and into said annular channels so locating the pellets axially in the casing and providing for good heat transfer between the pellets and the casing.

6. The manufacture according to claim 5, wherein said casing has a wall .010" thick and said fluid pressure is 6000 p.s.i.

7. The process of manufacturing a fuel element for a nuclear reactor comprising the steps of producing a thin walled tubular casing of uniform internal diameter, producing a plurality of substantially cylindrical pellets of fissile material, each said pellet having an external diameter less than that of the casing so as to be a slack fit in the casing and having at least one rebate in the length thereof, inserting the pellets in end to end relation in the casing, and decreasing the inside diameter of the casing throughout substantially its entire length by subjecting the casing externally to a hydrostatic pressure to deform the casing into close thermal contact with the external surfaces of the unrebated portions of the pellets and into close thermal contact with the external surfaces of said rebates of the pellets to locate the pellets axially in the casing and provide good heat transfer between the pellets and the casing.

8. In the manufacture of a fuel element for a nuclear reactor, the steps of producing a thin walled tubular casing of uniform internal diameter, producing an external spacer rib on said casing, producing a plurality of substantially cylindrical pellets of fissile material, each said pellet having an external diameter less than that of the casing so as to be a slack fit in the casing and having at least one rebate in the length thereof, inserting the pellets in end to end relation in the casing, and deforming the casing into contact with the pellets and into said rebates thereby to locate the pellets against displacement lengthwise of the tubular casing.

References Cited by the Examiner

UNITED STATES PATENTS

| | | | |
|---|---|---|---|
| 1,084,115 | 1/14 | Slick et al. | 29—422 |
| 2,093,092 | 9/37 | McElhany | 29—421 |
| 2,106,496 | 1/38 | Debor | 29—421 |
| 2,293,426 | 8/42 | Coberly | 29—421 |
| 2,576,085 | 11/51 | Vivian | 29—421 |
| 2,756,492 | 7/56 | Pettibone | 29—420.5 |
| 2,863,814 | 12/58 | Kesselring et al. | 204—193.2 |
| 2,863,816 | 12/58 | Stacy | 204—193.2 |
| 2,878,140 | 3/59 | Barr | 75—208 |
| 2,892,253 | 6/59 | Hutchins et al. | 29—421 |
| 2,892,254 | 6/59 | Garvin | 29—421 |
| 2,900,712 | 8/59 | Keating | 29—422 |
| 2,936,520 | 5/60 | Sternberg | 29—421 |
| 2,947,080 | 8/60 | Kates | 204—154.2 |
| 2,991,601 | 7/61 | Glatter | 204—154.2 |
| 3,092,901 | 6/63 | Sharples | 176—76 X |
| 3,100,742 | 8/63 | McGeary et al. | 29—510 X |

FOREIGN PATENTS

| | | |
|---|---|---|
| 1,032,438 | 6/58 | Germany. |
| 789,257 | 1/58 | Great Britain. |
| 794,614 | 5/58 | Great Britain. |
| 884,969 | 12/61 | Great Britain. |

WHITMORE A. WILTZ, *Primary Examiner.*

ROGER L. CAMPBELL, HYLAND BIZOT, *Examiners.*